Patented Sept. 15, 1953

2,652,370

UNITED STATES PATENT OFFICE 2,652,370

PROCESS FOR BREAKING SOAP-THICKENED PETROLEUM GELS

Thomas G. Wisherd, Tulsa, Okla., assignor, by mesne assignments, to Sinclair Oil and Gas Company, Tulsa, Okla., a corporation of Maine No Drawing. Application April 20, 1951, Serial No. 222,165

6 Claims. (Cl. 252—326)

My invention relates to the breaking of soap thickened petroleum gels. In particular, I have found that an oil-soluble neutralized sulfonated mixture of polyalkylated benzenes when added to soap thickened petroleum distillate or soap thickened crude oil gels in small proportions are especially effective in breaking the gels.

A process has recently been developed for improving the productivity of oil wells in which the production formation permeability is increased by hydraulically fracturing the formation. This process consists essentially of (1) fracturing an oil bearing formation by injecting a viscous liquid containing a granular material, such as sand for a propping agent, under high hydraulic pressure and (2) causing the viscous liquid to change from a high to a low viscosity so that it may be readily displaced from the formation. My invention is concerned primarily with the second step of this process.

The viscous fluid injected into the formation is usually an oil such as crude oil or a petroleum distillate to which has been added a bodying or gelling agent. Napalm, which is an aluminum soap derived from a mixture of coconut and naphthenic and oleic acids, is the usual gelling agent. Although the Napalm-petroleum gels will revert to sols within a few hours if they are in quiescent contact with either salt water or many types of crudes, it is also possible and often desirable to use solutions which will break these gels in a few minutes under quiescent contact conditions. I have found that gels of the Napalm-petroleum type can be more readily and completely broken by contact with a small proportion of an oil-soluble neutralized sulfonated mixture of polyalkylated benzenes. The useful materials are derived from the bottoms from the production of dodecylbenzene (Neolene) and hereafter are referred to as the neutralized sulfonated Neolene bottoms or the gel-breaker. The neutralized sulfonated Neolene bottoms I use are prepared by the sulfonation and subsequent neutralization of the bottoms produced in the manufacture of monododecylbenzene, i. e., the bottoms remaining after fractionation to remove the monododecylbenzene cut from the reaction products of dodecene with benzene, which bottoms consist essentially of di-dodecylbenzene along with other polyalkylated benzene molecules.

Although oil-soluble sulfonates have been found to possess valuable gel-breaking characteristics when employed in this process, the available supply of petroleum mahogany sulfonates is limited. The ammonia and alkali salts of the usual sulfonated materials have in general proven too oil insoluble-water soluble to give the best results. Consequently the high oil solubility of my neutralized sulfonated Neolene bottoms was not to be expected. This is especially true in view of the repeated efforts to secure less water soluble-more oil soluble sulfonates by neutralization with various amines or esterification with higher alcohols, glycols, and hydroxyamines, which products are unduly expensive. Moreover my neutralized sulfonated Neolene bottoms have been found to be superior to the petroleum mahogany sulfonates in that they effect a more rapid breaking of the gel once the desired formation fracture is achieved.

In the practice of my invention, I customarily dilute the acid sulfonated bottoms with isopropanol, water, and a non-volatile highly aromatic petroleum solvent before the neutralization. However the amount and type of diluent added to the acid sulfonates prior to neutralization is not an essential part of the product and may be varied as desired or eliminated entirely depending upon the use of the sulfonates. The diluent is added only for the purpose of reducing the viscosity of the sulfonates to facilitate handling. Advantageously I employ anhydrous ammonia as the neutralizing agent. However the sodium neutralized sulfonated Neolene bottoms also have desirable gel-breaking properties.

Tests and the compositions of three typical concentrates follow:

| | | | |
|---|---|---|---|
| Pour | | −25 | |
| Nitrogen, percent | 2.83 | 2.24 | 2.12 |
| Sulfur, percent | 4.68 | 4.52 | 4.57 |
| Acid. No | 70.3 | 90.2 | 77.3 |
| Saponification No | 99.7 | 96.6 | 86.8 |
| Ash | .278 | .002 | .013 |

The amounts of the neutralized sulfonated Neolene bottoms employed are between 1 to 30 parts per 100 parts of the soap thickened petroleum gels. Less than the minimum amount is generally ineffective in breaking the gel while over the maximum amount is unnecessary and wasteful.

An illustration of the method of preparation of my novel neutralized sulfonated Neolene bottoms, is presented in the following example.

*Example I*

The bottoms from the production of dodecylbenzene which I employed in producing this particular concentrate were "Neolene 400 bottoms" obtained commercially from the Sharples- Continental Corporation. Typical physical properties of "Neolene 400 bottoms" are as follows:

Engler Range:
| | |
|---|---|
| IBP | 644° F. |
| 1 percent | 671 |
| 2 | 685 |
| 3 | 690 |
| 4 | 695 |
| 5 | 698 |
| 20 | 723 |
| 50 | 739 |
| 70 | 753 |
| 90 | 775 |
| 92 | 777 |
| 93 | 778 |
| 94 | 779 |
| 96 | 780 |
| 97 | 780 |
| 98 | 780 |
| FBP | 780 |
| Percent rec. | 99 |
| Spec. gravity at 100° F. | 0.8639 |
| Spec. gravity at 130° F. | 0.8545 |
| Viscosity in centipoises at 130° F. | 45.8 |
| Color | Dark brown |
| Molecular weight | 403±15 |

"Neolene 400 bottoms" were charged in the amount of 1888 pounds to a conventional type Monel sulfonator and sulfonated by the addition of commercial 20% oleum totaling 1782 pounds. The mass was agitated continuously during the addition of the oleum and the temperature was held to a maximum of 147° F. by the circulation of cooling water through continuous coils located in the acid mass, and by the rate of oleum addition. The total time required for oleum application was 50 minutes.

The acid mass was next washed by the gradual application of 1335 pounds of water. Agitation was continued during the washing operation and until the sulfonated bottoms-diluted acid was pumped to the settler. Due to the heat evolved by dilution of the partially spent oleum during the washing operation the temperature rose rapidly. The washing temperature was held to a maximum of 196° F. by controlling the rate of addition of the water and by means of the cooling coils. The time required for the washing operation was 90 minutes and the final temperature was 185° F. The washed sulfonated mixture was then pumped to a glass-lined, water-jacketed settling tank which had been brought to 185° F. by injecting steam into the water in the jacket. The mass was allowed to settle without any further application of heat for a period of 16 hours. At the end of the 16 hour settling period the temperature of the mass was 152° F.

The diluted acid was now drawn from the bottom of the settler and discarded. The acid sulfonates, containing only a small amount of dilute sulfuric acid, were drawn to a neutralizing vessel and diluted with 18 gallons of 99% isopropanol, 18 gallons of water, and 35 gallons of a nonvolatile, highly aromatic petroleum solvent. The diluted acid sulfonates were neutralized by the addition of 122 pounds of anhydrous ammonia, and the finished product drawn to drums for storage. The yield was 356 gallons. The material produced by the above process may or may not contain some excess ammonia. It is a semiviscous fluid at atmospheric temperatures and is miscible in all proportions with paraffinic petroleum oils such as kerosine and low viscosity white oils.

I claim:

1. A process for breaking soap thickened petroleum gels, characterized by subjecting the gel to the action of an agent produced by the sulfonation and neutralization of the bottoms produced in the manufacture of dodecylbenzene, which bottoms consist essentially of di-dodecylbenzene along with other polyalkylated benzene molecules.

2. The process according to claim 1 in which the neutralizing agent is ammonia.

3. The process according to claim 1 in which the neutralizing agent is a sodium compound.

4. A process for breaking soap thickened petroleum gels, characterized by subjecting the gel to the action of between 1 to 30 parts per 100 parts of the soap thickened petroleum gel of an agent produced by the sulfonation and neutralization of the bottoms produced in the manufacture of dodecylbenzene which bottoms consist essentially of di-dodecylbenzene along with other polyalkylated benzene molecules.

5. The process according to claim 4 in which the neutralizing agent is ammonia.

6. The process according to claim 4 in which the neutralizing agent is a sodium compound.

THOMAS G. WISHERD.

References Cited in the file of this patent

UNITED STATES PATENTS

| Number | Name | Date |
|---|---|---|
| 2,110,837 | Blair | Mar. 8, 1938 |
| 2,501,015 | Wirtel | Mar. 21, 1950 |
| 2,524,891 | De Groote | Oct. 10, 1950 |
| 2,543,223 | Blair | Feb. 21, 1951 |
| 2,568,736 | Kirkpatrick | Sept. 25, 1951 |
| 2,596,844 | Clark | May 13, 1952 |